(No Model.) 2 Sheets—Sheet 1.

I. W. NICHOLS.
METHOD OF PURIFYING AND DRYING TEA.

No. 255,185. Patented Mar. 21, 1882.

(No Model.) 2 Sheets—Sheet 2.

I. W. NICHOLS.
METHOD OF PURIFYING AND DRYING TEA.

No. 255,185. Patented Mar. 21, 1882.

Witnesses
Harold Serrell
Chas. H. Smith

Inventor
Isaac W. Nichols
per Lemuel W. Serrell
Atty

N. PETERS, Photo-Lithographer, Washington, D. C.

UNITED STATES PATENT OFFICE.

ISAAC W. NICHOLS, OF BROOKLYN, NEW YORK.

METHOD OF PURIFYING AND DRYING TEA

SPECIFICATION forming part of Letters Patent No. 255,185, dated March 21, 1882.

Application filed November 16, 1881. (No model.)

*To all whom it may concern:*

Be it known that I, ISAAC W. NICHOLS, of Brooklyn, in the county of Kings and State of New York, have invented an Improvement in Methods of Purifying and Drying Tea and other Materials, of which the following is a specification.

Tea frequently has a musty smell from transportation, and at other times has a smell of camphor. Spices and other materials often become musty and objectionable in their smell during transportation, and sometimes there is a moisture that interferes with their sale and permanent qualities. I make use of steam directed upon the tea or other materials to volatilize the impurities, and I then dry the said materials.

Figure 1:
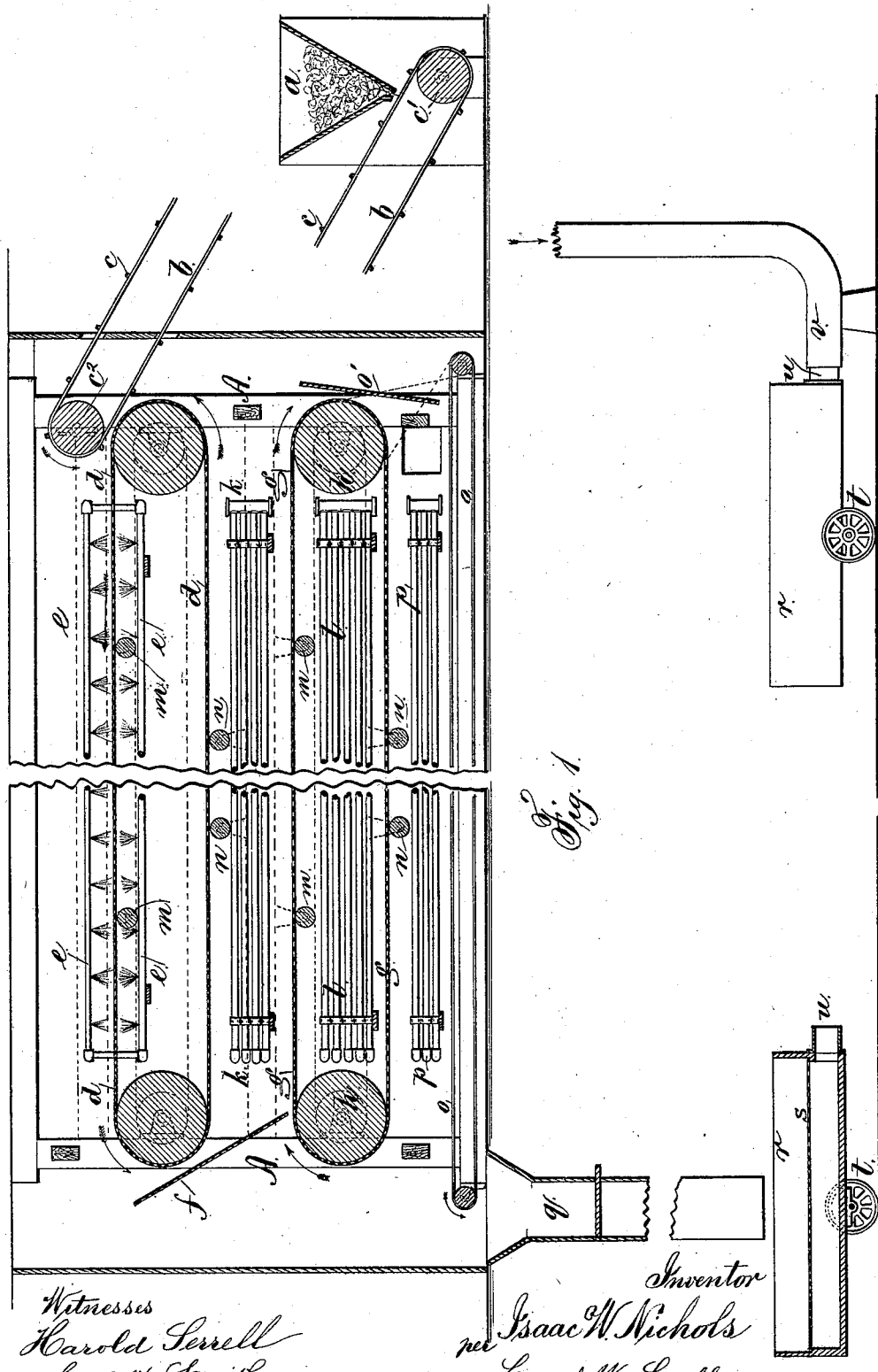
Figure 2:
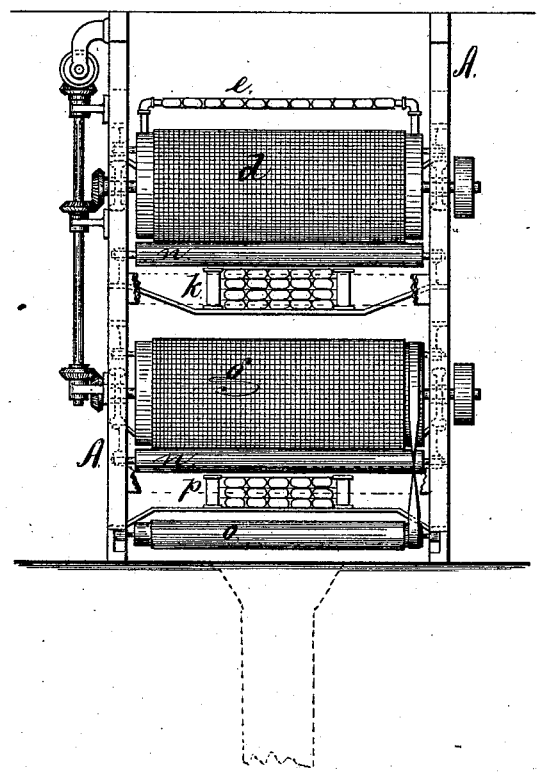

In the drawings, Figure 1 is a vertical sectional view longitudinally of my apparatus, and Fig. 2 is an end view of the same.

The materials are thrown into a hopper or receptacle, $a$, and said hopper is made with a long and narrow opening at the bottom across the endless belt $b$ and above the same. Said endless belt $b$ is preferably made of canvas, with slats $c$ across its face and secured to it, and it passes over the rollers $c'$ $c^2$. The tea or similar material is thrown into the hopper and passes from the long narrow mouth in a thin layer upon the belt $b$, and it is kept from falling back by the slats $c$, and said belt is set at an inclination of about thirty-five or forty degrees, and in its revolution carries the material up and over the higher roller, $c^2$, where it is delivered upon the surface of the endless belt $d$ of wire-cloth. I remark that said belt may be set at a greater angle and made to employ buckets instead of the slats. There are steam-pipes $e$ $e$ above or below the layer of material, and said pipes are perforated on the sides next the material, so as to moisten the tea by the escaping steam, and thereby carry off any musty smell or other impurities. The tea or similar material passes off the end of the belt $d$ upon an inclined chute or return-plate, $f$, that delivers the same upon a second endless belt, $g$, that is by preference of wire-cloth, such belt $g$ passing around the cylinders $h$, by which it is driven, and there are ranges of steam-pipes $k$ above and $l$ below the said belt, so that the materials thereon are exposed to the heating and drying action. The upper portions of the endless belts $d$ and $g$ are supported by rollers $m$ $m$, that pass across beneath them at suitable distances apart, and their journals are in bearings in the frame A of the machine. These rollers serve to keep the upper part of the endless belt in a nearly flat condition, and there are similar rollers, $n$, at the return side of the endless belt for a similar purpose. The lowest endless belt, $o$, receives the material from the belt $g$, the said belt being by preference of linen or cotton, and it is supported upon a table, rollers, or cross-slats, over which said belt is drawn along. There is a steam-coil, $p$, above this belt, the same being supported by cross-bearers from the frame, so that the steam-coil is in close proximity to the top of the material, that is spread upon and carried along by the said endless belt $o$.

$o'$ is the inclined board or hopper to direct the material upon the belt $o$ as it is delivered from the belt $g$.

The parts are to be moved by suitable power, and the speed of movement will depend upon the time required for the steam and heat to act upon the tea or similar material to remove the musty odor or the dampness from the same.

It will be understood from the foregoing that the direct contact of the steam with the tea or similar material serves to moisten the same and render the removal of musty odors by the subsequent heating operation possible, because such moisture from the steam absorbs, takes up, and conveys away these foreign matters. If, however, the tea or similar material were boxed after it passed away from the endless apron $o$, it would become injured by the heat that is retained in it. I therefore pass the tea by a chute, $q$, into a box, $r$, having a closed bottom, and a diaphragm, $s$, of wire-cloth at a little distance above the bottom. For convenience of transportation this box $r$ is on wheels $t$, and there is a coupling-nozzle, $u$, at one end, that is connected to the blast-pipe $v$, through which air is forced by a suitable blower, and it rises through the wire-cloth screen $s$ and passes among the tea, agitating the same, cooling it, and carrying off any moisture or remaining odors, so that the tea in the box is in a condition for packing and shipping.

Heated air may be directed into the space or chamber in which the tea is purified and allowed to escape with the steam and dust; or with some qualites of tea the heated air may be used in place of the steam.

Some of the teas that are brought to this market are colored artificially, and the coloring-matter is not desirable on the tea. This coloring-matter appears to have been applied in the form of a powder during the curing operation, and is supposed to consist of such substances as gypsum, Prussian blue, and turmeric. My apparatus is adapted to the removal of these foreign substances and the restoration of the tea to its original condition. I have discovered that jets of steam directed upon the tea agitate the same and loosen these substances, and blow them off into the atmosphere, and thereby the tea is purified. The steam may be directed upon the tea for the removal of these foreign substances from any suitable nozzle or pipe with numerous small openings.

I am aware that tobacco has been dried upon belts and agitated by steam when passing from one belt to another; also, that steam has been applied directly to grain as it slid along a heated table. In my improvement, the tea being upon a belt, when acted upon by the steam, it is not scattered, and the tea is not broken or injured by agitation upon any hard substance, and the steam passes up through the belt, as well as being blown down upon the tea. By my improvement the tea is purified without being injured.

I claim as my invention—

1. The method herein specified of purifying tea and similar materials, consisting in bringing steam into direct contact with such material while spread in a thin layer upon a moving apron, the steam being blown down upon the material as well as passing up through the apron, then drying the same, and driving off volatile impurities by the action of heat, substantially as set forth.

2. The method herein specified of purifying, agitating, and drying tea and similar material, consisting in spreading the material on a moving apron, carrying the same into contact with jets of steam blown down upon the material, passing the material from one apron to another, and exposing the same to the action of heat for drying the same, substantially as set forth.

3. The method herein specified of purifying, drying, and cooling tea and similar materials, consisting in exposing a thin layer to the direct action of steam blown down upon the material, then to the action of heat, and then to the action of cool atmospheric air, substantially as set forth.

Signed by me this 4th day of November, A. D. 1881.

ISAAC W. NICHOLS.

Witnesses:
HAROLD SERRELL,
WILLIAM G. MOTT.